(12) United States Patent
Yang et al.

(10) Patent No.: US 8,855,603 B2
(45) Date of Patent: Oct. 7, 2014

(54) LOCAL SECURITY KEY UPDATE AT A WIRELESS COMMUNICATION DEVICE

(75) Inventors: Xiangying Yang, Portland, OR (US); Avishay Sharaga, Bet Nehemya (IL); Elad Levy, Nes Ziona (IL); Chang Hong Shan, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/582,887

(22) PCT Filed: Mar. 5, 2011

(86) PCT No.: PCT/US2011/027323
§ 371 (c)(1),
(2), (4) Date: Nov. 15, 2012

(87) PCT Pub. No.: WO2011/109795
PCT Pub. Date: Sep. 9, 2011

(65) Prior Publication Data
US 2013/0137398 A1    May 30, 2013

Related U.S. Application Data (60) Provisional application No. 61/311,174, filed on Mar. 5, 2010.

(51) Int. Cl.

| | |
|---|---|
| *H04M 1/66* | (2006.01) |
| *H04M 1/68* | (2006.01) |
| *H04M 3/16* | (2006.01) |
| *H04L 1/00* | (2006.01) |
| *H04W 12/04* | (2009.01) |
| *H03M 13/29* | (2006.01) |
| *H04W 72/04* | (2009.01) |
| *H03M 13/09* | (2006.01) |
| *H04W 28/04* | (2009.01) |
| *H04L 1/12* | (2006.01) |

(52) U.S. Cl.
CPC .............. *H04W 12/04* (2013.01); *H03M 13/29* (2013.01); *H04L 1/0073* (2013.01); *Y02B 60/50* (2013.01); *H04W 72/0413* (2013.01); *H04L 1/0061* (2013.01); *H03M 13/09* (2013.01); *H04W 28/04* (2013.01); *H04L 2001/125* (2013.01); *H04L 1/0041* (2013.01)
USPC ........................................................ 455/411

(58) Field of Classification Search
USPC ........................................................ 455/411
See application file for complete search history.

(56) References Cited

U.S. PATENT DOCUMENTS

| | | | | |
|---|---|---|---|---|
| 7,526,274 | B2 * | 4/2009 | Bernard et al. | ............... 455/411 |
| 8,261,077 | B2 * | 9/2012 | Lim et al. | ...................... 713/170 |

(Continued)

FOREIGN PATENT DOCUMENTS

| | | |
|---|---|---|
| WO | 2009/132599 A1 | 11/2009 |
| WO | 2009/136981 A1 | 11/2009 |

(Continued)

OTHER PUBLICATIONS

International Preliminary Report on Patentability received for PCY Patent Application No. PCT/US2011/027323, mailed on Sep. 20, 2012, 7 Pages.

(Continued)

*Primary Examiner* — Nathan Mitchell
(74) *Attorney, Agent, or Firm* — Thorpe North & Western LLP (57) ABSTRACT

A system and method for updating a security key at a base station (BS) is disclosed. The method comprises the operation of transmitting a handover command from the base station to a mobile station. The operation of incrementing a base station instance of an authentication key counter at the base station follows. The next operation of the method can be calculating a new local authentication key (AK*) at the base station using the base station instance of the authentication key counter and an authentication key (AK). The AK may be previously obtained from an authenticator. The method further includes communicating by the base station with the mobile station using the new local authentication key after a predetermined action time.

25 Claims, 7 Drawing Sheets

(56) References Cited

U.S. PATENT DOCUMENTS

| | | |
|---|---|---|
| 2007/0224986 A1* | 9/2007 | Bakshi et al. ............... 455/436 |
| 2008/0090549 A1* | 4/2008 | Vialen et al. ............... 455/405 |
| 2009/0054036 A1* | 2/2009 | Chen et al. ............... 455/411 |
| 2009/0054066 A1* | 2/2009 | Jang et al. ............... 455/436 |
| 2009/0136036 A1 | 5/2009 | Lkada |
| 2009/0181643 A1* | 7/2009 | Thakare ............... 455/411 |
| 2009/0209259 A1 | 8/2009 | Brusilovsky et al. |
| 2009/0274302 A1 | 11/2009 | Wu et al. |
| 2010/0046467 A1 | 2/2010 | Chiou et al. |
| 2013/0109347 A1* | 5/2013 | Feng et al. ............... 455/411 |

FOREIGN PATENT DOCUMENTS

| | | |
|---|---|---|
| WO | 2011/109795 A2 | 9/2011 |
| WO | 2011/109795 A3 | 1/2012 |

OTHER PUBLICATIONS

International Search Report and Written Opinion for PCT/US2011/027323 mailed on Nov. 25, 2011, eight pages.

Office Action received for Japanese Patent Application No. 2012-556280, mailed on Sep. 10, 2013, 2 pages, including 1 page of English translation.

Paraviz Yegani, WiMAX Overview document, Nov. 2005. 22 pages.

Philip Kwan, White Paper: 802.1X Authentication & Extensible Authentication Protocol (EAP), May 2003. 12 pages.

3GPP TS33.401 V8.0.0, "3GPP System Architecture Evolution (SAE): Security Architecture", Release 8, Jun. 2008, pp. 1-45.

Office Action received for Korean Patent Application No. 10-2012-7025703, mailed on Jan. 29, 2014, 5 pages of Office Action including 2 pages of English Translation.

Notice of Allowance received for Japenese Patent Application No. 2012-556280, mailed on Mar. 25, 2014, 1 page of Notice of Allowance only.

* cited by examiner

LOCAL SECURITY KEY UPDATE AT A WIRELESS COMMUNICATION DEVICE

CLAIM OF PRIORITY

This application is a National Stage of PCT/US2011/027323, filed on Mar. 5, 2011, entitled "LOCAL SECURITY KEY UPDATE AT A WIRELESS COMMUNICATION DEVICE", which claims priority of U.S. Provisional patent application Ser. No. 61/311,174, filed on Mar. 5, 2010, entitled "ADVANCED WIRELESS COMMUNICATION SYSTEMS AND TECHNIQUES", both of which are herein incorporated by reference in their entirety.

BACKGROUND

Providing secure connections and protecting traffic confidentiality and integrity between mobile stations (MSs) and base stations (BSs) via wireless communications can be challenge for wireless mobile communication technology. Each wireless technology can provide standards, procedures, and protocols to ensure security and authentication of messages between the mobile stations and base stations. Wireless mobile communication standards can include the third generation partnership project (3GPP) long term evolution (LTE) standard and the Institute of Electrical and Electronics Engineers (IEEE) 802.16 standard (e.g., 802.16e, 802.16m), which is commonly known to industry groups as WiMax (Worldwide interoperability for Microwave Access).

Some common security risks include identity exposed, dictionary attack, man-in-the-middle (MitM) attack, and session hijacking. The Extensible Authentication Protocol (EAP) can be used to mitigate security risks by using keys and message authentication. EAP is a mechanism that can define a standard message exchange between devices using an agreed upon authentication protocol.

Figure 1:
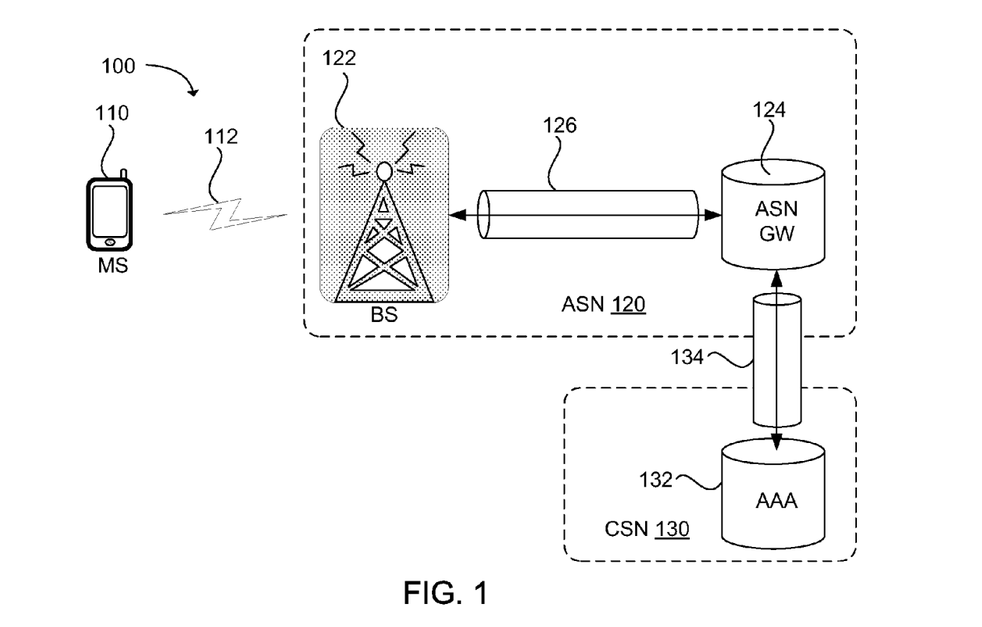
FIG. 1 illustrates a block diagram of a wireless network in accordance with an example.

A typical WiMax wireless network 100, as illustrated in FIG. 1, can include a mobile station (MS) 110, a base station (BS) 122, an Access Service Network (ASN) Gateway (GW) 124, and an Authentication, Authorization and Accounting (AAA) server 132. The base station and the ASN gateway can be included as part of the ASN 120, and the AAA server can be included as part of the Connectivity Service Network (CSN). Communication between networking devices may have different interfaces with various signaling overheads. Communication between the mobile station and the base station (or other ASN device) may use an R1 interface 112. Communication between the base station and the ASN gateway (in the ASN) may use a R6 interface 126. Communication between the ASN gateway (or other ASN device) and the AAA server (or other CSN device) may use a R3 interface 134.

During a successful WiMax EAP authentication between the mobile station (MS) 110 and the AAA server 132, a Pairwise Master Key (PMK) can be generated, which resides on both the mobile station and the AAA server. The PMK may be transmitted to the ASN gateway 124. The ASN gateway may be referred to as an Authenticator. The ASN gateway and mobile station may separately calculate an authentication key (AK). The authentication key may be transferred to the base station. The base station and mobile station may use the authentication key to encrypt and decrypt messages.

After a specified time or event indicating that data integrity has been comprised, the mobile station (MS) 110 and the AAA server 132 may provide EAP re-authentication used to generate a new authentication key. EAP authentication or calculating a new AK can occur each time handover occurs between base stations in the ASN.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In the IEEE 802.16e security framework, security keys may be refreshed during either a (re)authentication or a handover. (Re)Authentication can involve Extensible Authentication Protocol (EAP) authentication with the Authentication, Authorization and Accounting (AAA) server. The AAA server can refresh all of the keys both in the network and those used to communicate via the air interface. However the process of re-authentication using the AAA server can take a relatively long time and can incur significant additional signaling overheads in the network.

Handover can occur when a mobile station (MS) moves from one cell to another or from one base station to another. Handover can be anchored at the same ASN using PMK sharing. Having a light-weight method to refresh the security keys used for encryption and integrity protection on the air interface can be desirable, even when the MS stays at the same base station (BS). The light-weight method to refresh the security keys may be referred to as an Intra-BS Handover procedure. The intra-BS handover can allow more frequent key refreshes to enable integrity check value (ICV) size reduction without compromising security protection or involving the AAA using a full EAP. With less traffic or network activity the ICV can be reduced to 8 bits, while an increase in the number of packets can increase the ICV size to increase security.

Disclosed is a system and method for updating a security key at a base station (BS) and/or a mobile station (MS). The method for updating a security key at a base station comprises the operation of transmitting a handover command from the base station to a mobile station. The operation of incrementing a base station instance of an authentication key counter at the base station follows. The next operation of the method can be calculating a new local authentication key (AK*) at the base station using the base station instance of the authentication key counter and an authentication key (AK). The AK may be previously obtained from an authenticator. The method further includes communicating by the base station with the mobile station using the new local authentication key after a predetermined action time.

The method for updating a security key at a mobile station (MS) comprises the operation of receiving a handover command at the mobile station from the base station. The operation of incrementing a mobile station instance of an authentication key counter at the mobile station follows. The next operation of the method can be calculating a new local authentication key (AK*) at the mobile station using the mobile station instance of the authentication key counter and an authentication key (AK). The AK may have been previously calculated by the mobile station. The method further includes communicating by the mobile station with the base station using the new local authentication key after a predetermined action time.

After EAP authentication during a network entry, both the Authenticator and the mobile station may establish or generate a valid Pairwise Master Key (PMK). Based on the PMK, an Authentication Key (AK) can be derived at both the Authenticator and mobile station. The Authenticator can pass the AK to the base station, and thus the base station and the mobile station can use the same AK to derive other keys for encryption and integrity protection.

In IEEE 802.16e, the AK can be derived as $$AK=KDF(PMK, MSID|BSID|\text{``AK''}, 160), \quad \text{[Equation 1]}$$

where MS identification (MSID) can be a 48 bit MS Media Access Control (MAC) address, BS identification (BSID) can be a 48 bit BS MAC address, and 160 can be the length of AK key (measured in bits) to be generated by a Key Derivation Function (KDF). Obviously, the authentication key can be calculated using IDs of different length to generate a key having a different length, as can be appreciated. Since the PMK, MSID, and BSID remain constant for the same mobile station and base station after an EAP authentication, the AK cannot be refreshed unless the MS performs re-authentication to refresh the PMK.

Typically each time communication transfers from one base station to another base station—a process called a handover—the AK is recalculated by the Authenticator and mobile station because the BSID changes. So a handover command can be used to refresh the AK, but not necessarily used to generate new a new PMK with every handover, in order to minimize handover latency and network overhead.

Other encryption keys used in IEEE 802.16e include a Cipher-based Message Authentication Code (CMAC) key and a Transport Encryption Key (TEK). In IEEE 802.16e, the TEK may be refreshed anytime because the different TEK can be generated by the base station from the same AK. The CMAC can be refreshed in any handovers to a different base station because a counter can be involved in the CMAC derivation scheme. The counter used in a CMAC calculation may be a CMAC_KEY_COUNT in IEEE 802.16e.

To enable IEEE 802.16m base station legacy Access Service Network (ASN) compatibility with the IEEE 802.16e and older standards, maintaining the aforementioned AK derivation in the Authenticator can be desirable. In the IEEE 802.16m standard, both CMAC keys and TEKs are derived from the AK, so generating a key refresh during a Handover (HO) can be beneficial. Another level of counter-based Authentication Key (AK), called AK* or local AK, may be derived "locally" at the base station based on the received AK from the Authenticator, and derived "locally" at the mobile station based on the AK calculated by the mobile station. The mobile station and base station can then use the locally derived AK* to derive other CMAC and TEK keys for encryption and integrity protection. The term local AK is equivalent to AK* and the terms may be used interchangeably in this disclosure.

An example of counter based AK* derivation is defined as follows:

$$AK^*=KDF(AK, MSID|BSID|AK\_COUNT|\text{``AK*''}, Length), \quad \text{[Equation 2]}$$

Where the Key Derivation Function (KDF) uses the AK, an MS MAC address for an MSID, a BS MAC address for a BSID, and either a base station instance or a mobile station instance of the authentication key counter (AK_COUNT) to calculate the new local authentication key having a key size of Length. The key size of Length may be 160 bits or another desired length, depending on the desired security level and the length of the MSID and BSID. The AK_COUNT can be a counter maintained at the mobile station, base station and the Authenticator to ensure the same AK* is not derived and reused when the mobile station handover occurs to the same base station with same BSID, i.e. the same AK still remains valid. Reusing a previously used AK* value may appear to the base station as a replay attack. Thus, not recalculating the same AK* can prevent replay attacks. IEEE 802.16 base stations can be vulnerable to a replay attack in which an attacker maliciously resends valid frames that the attacker has intercepted in the middle of a forwarding (relaying) process. In one embodiment, the AK_COUNT may be maintained as a CMAC_KEY_COUNT.

Other encryption keys derived from the AK can be a CMAC key and a TEK. The CMAC key may be used to calculate a CMAC (or CMAC digest), where the CMAC is used in a range request or handover command to validate a new local AK (AK*). The TEK can be used to encrypt the data traffic. A TEK counter may be used for data traffic and may cycle or update more frequently than AK_COUNT or a CMAC counter. The overflow or rollover of the TEK counter can create a triggering event for an intra-BS handover and generating a new AK*. Accordingly, a large traffic volume may trigger a local security update. Other network events may also trigger the intra-BS handover.

With the local AK (AK*) in the key hierarchy (PMK, AK, AK*, CMAC key, and TEK), the base station and mobile station may refresh their security keys from the AK* level by simply increasing the AK_COUNT value without involving the Authenticator in the generation of a new AK or the local AK (AK*). Since key derivation is involved, not using full EAP authentication, the key refresh method can be simple and fast. Such key derivation operation is not necessarily triggered by the Authenticator since AK* is "local". Updating the AK_COUNT value with the Authenticator after key refresh may be desirable, to maintain counter synchronization. Using the local AK (AK*) may not provide the same level of security as a full EAP, but efficiency gains may outweigh the security considerations in many situations.

Each type of device a wireless communication system may communicate with another type of device based on a specified interface, where each interface has different security protocols, different transmission speeds, and different signaling overheads. The Wimax network reference model includes eight reference points that are conceptual links that can connect two functional entities in the network. Reference points represent a bundle of protocols between peer entities, similar to an IP network interface. Interoperability is enforced through reference points without dictating how vendors implement the edges of those reference points. The references are well documented in the Wimax specification. A summary of some of the reference points is discussed in the present application and is provided below for convenience.

R1—the interface between the MS and the ASN as per the air interface (Physical Layer (PHY) and MAC) specifications (IEEE P802.16d/e). R1 may include additional protocols related to the management plane. The R1 interface 112 can be provided between mobile station 110 and base station 122, as shown in FIG. 1. The R1 interface may have faster transmission times and less overhead than other interfaces, such as R3, R5, and R6, which can be used in full EAP authentication.

R3—the interface between the ASN and the CSN to support AAA, policy enforcement and mobility management capabilities. R3 can encompass the bearer plane methods (e.g., tunneling) to transfer IP data between the ASN and the CSN. The R3 interface 134 can be provided between the ASN gateway (or Authenticator) 124 and the AAA server 132, as shown in FIG. 1.

R5—consists of a set of control plane and bearer plane protocols for internetworking between CSNs operated by either the home or visited Network Service Provider (NSP).

R6—consists of a set of control and bearer plane protocols for communication 126 between the base station 122 and the ASN gateway (or Authenticator) 124, as shown in FIG. 1.

R8—consists of a set of control plane message flows and, in some situations, bearer plane data flow forwarding between base stations and relay stations.

Eliminating the additional communication between the base station and the Authenticator and between the Authenticator and the AAA server used in EAP authentication while still providing some refresh of authentication keys can be desirable. The intra-BS handover can allow refresh of authentication keys without incurring additional signaling overheads associated with R3, R5, and R6 interfaces.

Figure 2:
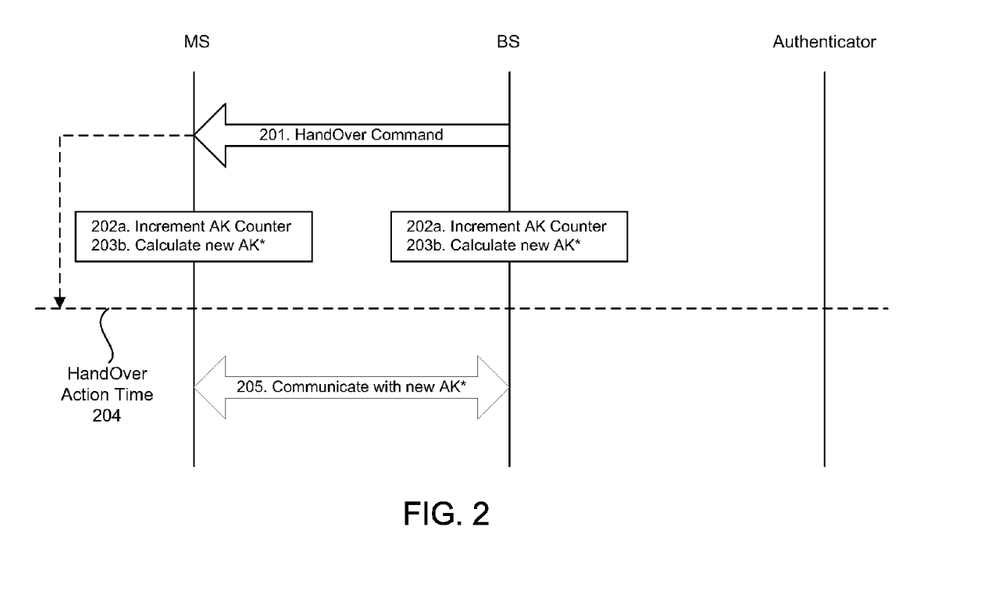
FIG. 2 illustrates a example process for updating a local security key at a base station (BS) and a mobile station (MS) in accordance with an example.

To enable the initiation of a key refresh based on the local AK (AK*), an "Intra-BS Handover" process can be used. Typically, a handover is used to transfer communication from one base station to another base station, at which time a new AK is generated, thus refreshing the AK. The base station can refer to a single logical MAC entity independently managing a cell or sector, and may not necessarily be limited to a physical device. The intra-BS handover process or protocol can use a similar handover command structure as is used in a regular handover for transferring communication between base stations. But the handover command 201 used in the intra-BS handover protocol may be for the purpose of key refresh, instead of finding a target frequency or cell for better signal quality, as illustrated in FIG. 2. The intra-BS handover command may select the target base station to be the same as current serving base station to force a refresh of the local AK (AK*). The handover command may include an action time which indicates a time period after which the new local AK may be used.

Instead of performing a full EAP authentication and generating a new PMK, the intra-BS handover procedure can increment the AK counter (AK-COUNT) 202*a* and 202*b* locally at both the base station and the mobile station. The AK counter at the base station can be referred to as the base station instance of an authentication key counter, and the AK counter at the mobile station can be referred to as the mobile station instance of an authentication key counter. Since both MSID and BSID remain the same, AK may also be the same, thus it is not necessary to contact the Authenticator to request a new AK to be transferred to the base station.

Both the mobile station and base station may locally calculate a new local AK (AK*) 203*a* and 203*b* using the base station or the mobile station instance of the AK counter and the AK. The AK may have been previously obtained by the base station from the Authenticator. The AK counter may be increased or incremented with every handover. After the handover action time 204 or a predetermined action time, the base station and mobile station may communicate with the new local AK (AK*) 205 and other keys derived from the new local AK (AK*). Other keys below the AK* level may be automatically refreshed. Using the intra-BS handover procedure can eliminate the time and overhead associated with contacting the Authenticator and the AAA server prior to refreshing the local AK or obtaining new security keys.

Figure 3A:
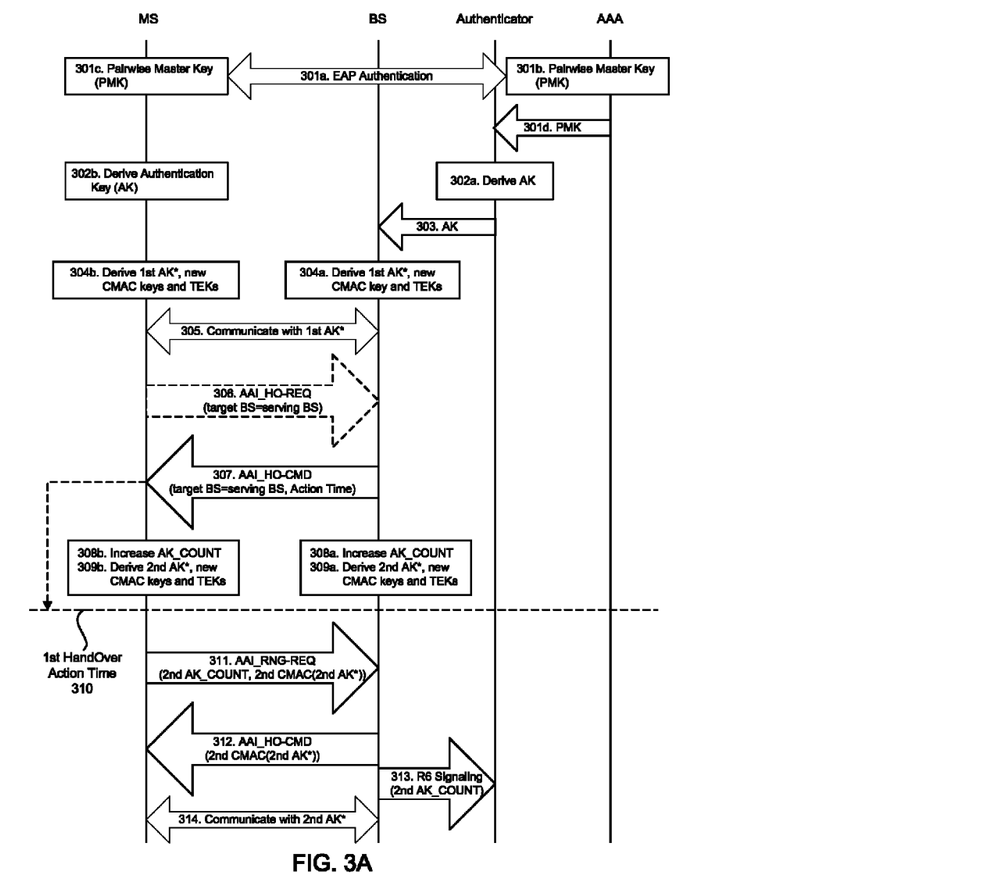
FIGS. 3A-3B illustrate a example intra-base station handover process for updating a local security key at a base station (BS) and a mobile station (MS) in accordance with an example.

FIG. 3 illustrates another example of a call flow for intra-BS handover based key refresh. Prior to the intra-BS handover protocol to refresh security keys, a mobile station and an AAA server may obtain a PMK 301*c* and 301*b* during a successful negotiation and EAP authentication 301*a*. The EAP authentication may occur with an inter-BS handover, an initial communication between the mobile station and any base station, or other type of network event requesting authentication.

The AAA server may transfer a copy of the PMK 301*d* to the Authenticator. Both the mobile station and the Authenticator may individually derive an AK 302*b* and 302*a* using the PMK. A copy of the AK 303 on the Authenticator may be transferred to the base station. The base station and mobile station may use the AK to generate other keys and encrypt and decrypt messages. Initially, a 1st AK* may be derived 304*a* and 304*b* on the base station and mobile station without a handover command or incrementing AK_COUNT. New CMAC keys and new TEKs may be derived from the 1st AK*. The AK* may be verified using a CMAC before coding or encrypting communication using the AK*. Then, the base station and mobile station may communicate using the 1st AK* 305 or keys derived from the 1st AK*.

A mobile station may make a handover request to the base station in the form of an advanced air interface (AAI) Handover (HO) Request (REQ). The AAI_HO-REQ 306 may be used when the handover is initiated by the mobile station. The request can indicate an intra-BS handover by setting the target base station equal to the serving or source base station. In response to the request, the base station can send a handover command in the form of an AAI_HO-CMD 307. In the case of a base station initiated handover, the base station can send an unsolicited AAI_HO-CMD 307 to the mobile station. The AAI_HO-CMD can indicate that the target base station is set to the serving base station and an Action Time, from which new security keys shall be used. As a result of the handover command, both the base station and mobile station may increase the AK_COUNT 308a and 308b and derive the 2nd AK* 309a and 309b (and subsequent AK*s).

To verify key update, which can occur after a 1st handover action time 310, the mobile station and base station can exchange a CMAC or CMAC digest calculated from new AK* in a ranging (RNG) request (REQ) or response (RSP). The AAI_RNG-REQ/RSP 311 can include both the mobile station instance of the AK_COUNT and the CMAC calculated from the CMAC keys, which are derived from the 2nd AK*. The RNG-RSP may be encrypted and thus the ICV may be used to serve the same purpose of integrity protection instead of using CMAC or CMAC digest.

The base station can ensure reception of the AAI_RNG-REQ by replying with an AAI_RNG-RSP 312 including the CMAC calculated from the CMAC keys derived on the base station. With successful CMAC verification, the intra-BS handover completes and base station can update the Authenticator with the 2nd AK_COUNT value 313 (and subsequent AK_COUNT values), to maintain counter synchronization. Then, the base station and the mobile station may communicate using the 2nd AK* 314 or keys derived from the 2nd AK*.

If the CMAC is not verified by the base station or the mobile station, the base station or the mobile station may continue using the 1st AK* or a full EAP authentication may be trigger depending on implementation.

Figure 3B:
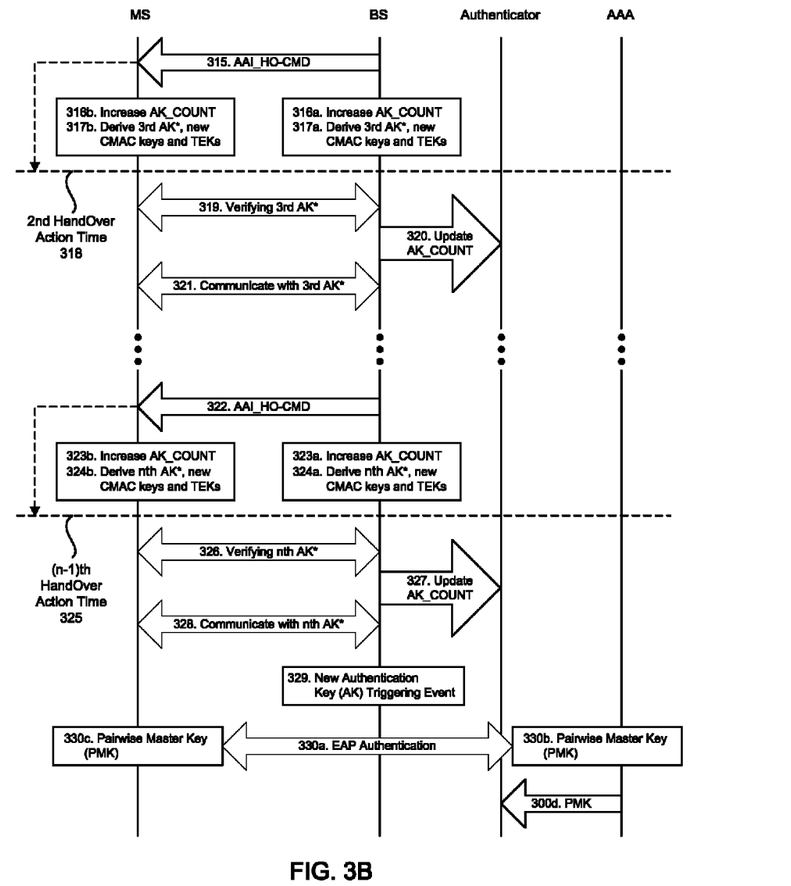

With another AAI_HO-CMD 315 indicating that the target base station is the same as the serving base station, the intra-BS handover process repeats, as illustrated in FIG. 3B. The base station instance and mobile station instance of the AK_COUNT is increased 316a and 316b and the 3rd AK* 317a and 317b is derived locally on both the base station and mobile station. After a 2nd handover action time 318, the 3rd AK* may be verified 319 by the mobile station and the base station and the AK_COUNT may be updated 320 at the Authenticator. Then, the base station and the mobile station may communicate using the 3rd AK* 321 or keys derived from the 3rd AK*.

The steps or operations 322-324b and 326-328 may repeat for each (n–1)th handover command with an (n–1)th handover action time 325, until an event triggers a request for new authentication keys 329, such as an inter-BS handover, a rollover or overflow of the AK_COUNT, or an action indicating a security breach or attempt at a security breach. When such an event occurs, a new AK may be generated for inter-BS handover or a new PMK 329b and 329c may be generated between the AAA server and mobile station as a result of a successful (re)authentication 330a. The AAA server may transfer a copy of the PMK 330d to the Authenticator and the process repeats.

The counter handling during intra-BS handover can be the same as a typical handover. In most common cases, the mobile station instance of the AK_COUNT (AK_COUNT$_{MS}$) can be the same as the base station instance of the AK_COUNT (AK_COUNT$_{BS}$). In some rare cases, the AK_COUNT$_{MS}$ sent from the mobile station is larger than the AK_COUNT$_{BS}$ maintained by the base station. In such cases, the base station may update its AK_COUNT$_{BS}$ to the larger AK_COUNT$_{MS}$ value and re-derive keys. In cases where the AK_COUNT$_{MS}$ is smaller than the AK_COUNT$_{BS}$, the base station can ignore the request as a replay or can treat many similar replays as a replay attack or a counter-out-of sync attack and request a new AK.

The intra-BS handover may be used in some handover scenarios when a Relay or an L2 Remote Radio Module (RRM) is used by a base station. Using a relay station (RS), a key refresh may be desirable where the key generation inputs (such as PMK, BSID, and MSID) remain the same due to deployment choices. For example, a deployment configuration may hide the relay from the network so that the base station gets the AK from the Authenticator based on the BSID and transfers the AK to the relay station for "local use" at the relay station. In such configurations the BSID is not used to generate the AK. When the mobile station moves between the base station and the relay station, the handover can appear to the Authenticator to be an "intra-BS" handover.

Figure 4:
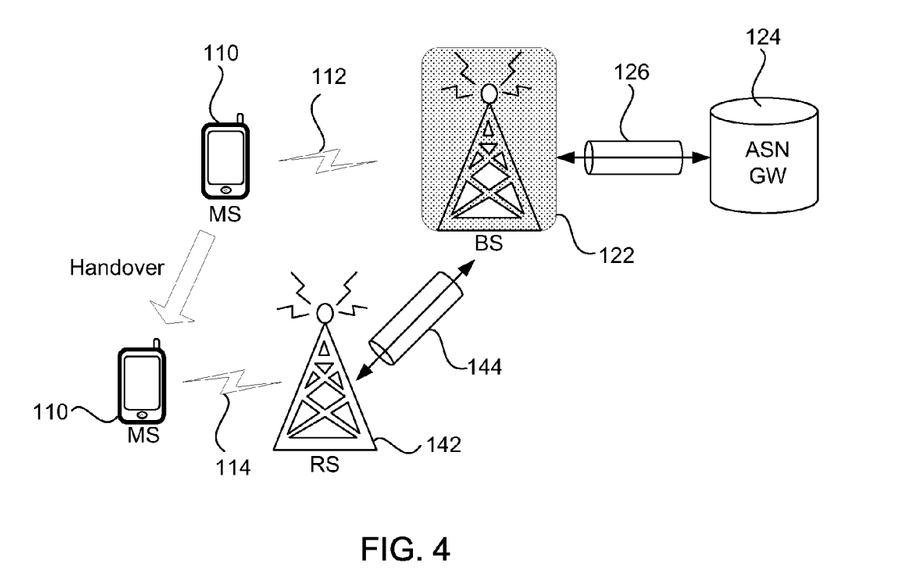
FIG. 4 illustrates a block diagram of a relay wireless network in accordance with an example.

FIG. 4 provides an illustration of an exemplary handover process where a mobile station 110 performs an intra-BS handover from a base station (BS) 122 to a relay station (RS) 142. The relay station may communicate with the base station using the R8 interface 144. Before the intra-BS handover a wireless communication channel 112 may be formed between the mobile station and the base station. After the intra-BS handover a wireless communication channel 114 may be formed between the mobile station and the relay station.

Figure 5:
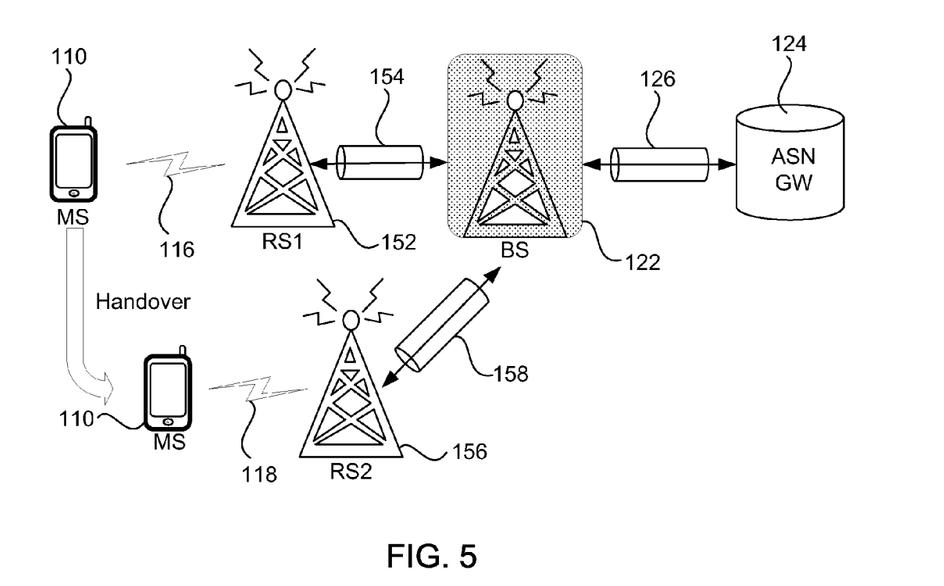
FIG. 5 illustrates a block diagram of a relay wireless network in accordance with an example.

In another example of a relay wireless network, as illustrated in FIG. 5, a mobile station 110 performs an intra-BS handover from a first relay station (RS1) 152 to a second relay station (RS2) 156 that are both within the cell of the same base station 122. The first relay station and the second relay station may communicate with the base station using the R8 interface 152 and 158, respectively. Before the intra-BS handover a wireless communication channel 116 may be formed between the mobile station and the first relay station. After the intra-BS handover a wireless communication channel 118 may be formed between the mobile station and the second relay station.

Figure 6:
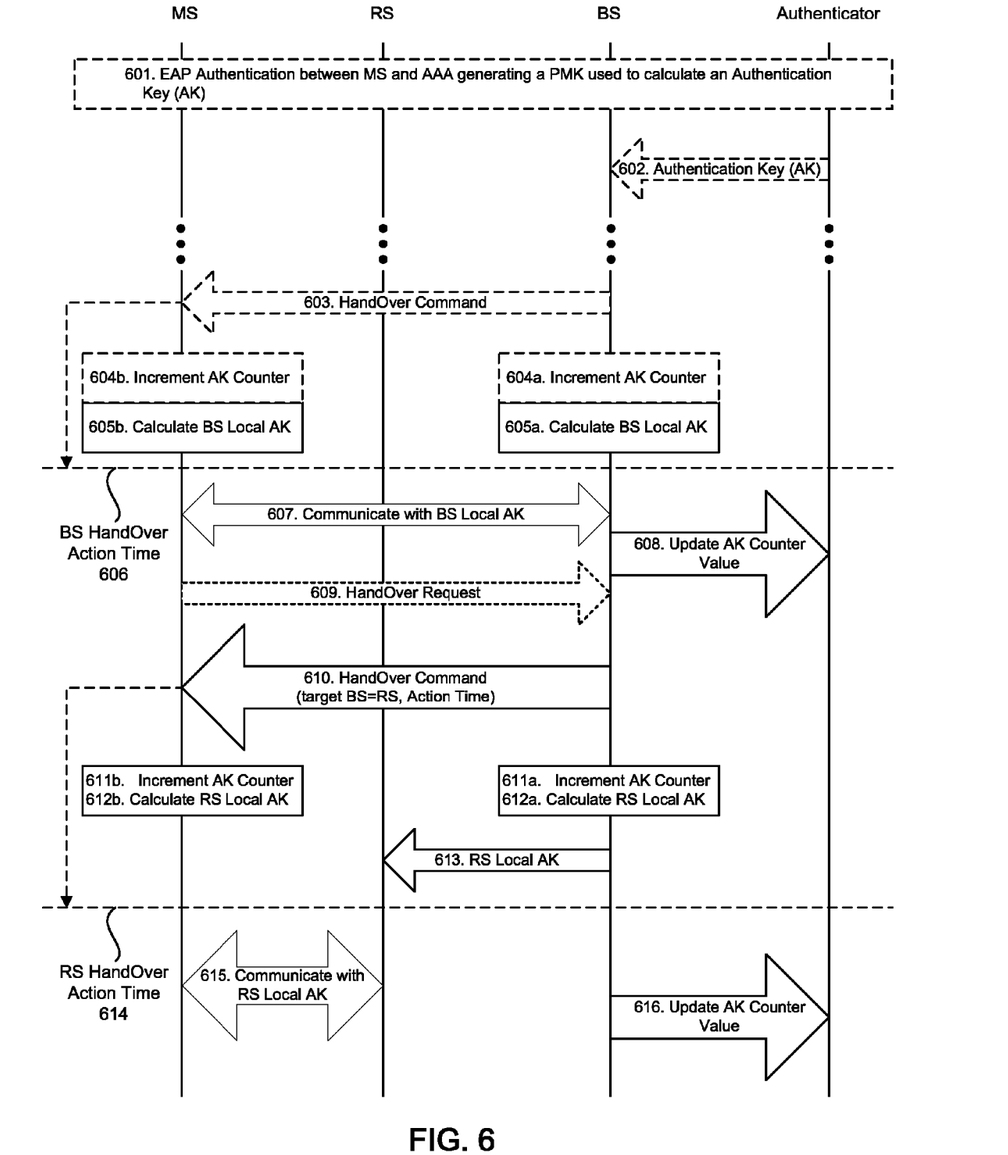
FIG. 6 illustrates a example process for updating a local security key at a base station (BS), relay station (RS), and a mobile station (MS) in accordance with an example.

FIG. 6 illustrates an example of an intra-BS handover from a mobile station to a relay station. Sometime prior to executing the intra-BS handover, a mobile station and an AAA server may obtain a PMK during a successful EAP authentication 601. A copy of the PMK may be provided to the Authenticator, and both the mobile station and the Authenticator may individually derive an AK from the PMK. A copy of the AK 602 on the Authenticator may be transferred to the base station. The intra-BS handover previously described may be used where a handover command 603 indicates that a target base station is set to a serving base station. As a result of the handover command, both the base station and mobile station may increase the AK counter 604a and 604b and calculate a base station local AK (AK*) 605a and 605b indicating that the target base station is the base station. After a base station handover action time 606, the base station and mobile station may communicate with the base station local AK 607 and the base station can update the Authenticator with the updated AK counter value 608.

The handover may be initiated by the mobile station with a handover request 609. The base station may respond to the request or send an unsolicited handover command 610 to the mobile station setting the target base station to the relay station within an action time. The handover request or handover command may be triggered when the mobile station moves away from the base station where the signal strength is weaker and closer to the relay station where the signal strength is stronger. As a result of the handover command, both the base station and the mobile station may increase the AK counter 611*a* and 611*b* and calculate a relay station local AK (AK*) 612*a* and 612*b* indicating that the target base station is the relay station. The relay station local AK may still use the BSID to calculate the relay station local AK (AK*). The base station may transmit a copy of the relay station local AK 613 to the relay station after the relay station local AK is calculated on the base station. After a relay station handover action time 614, the relay station and mobile station may communicate with the relay station local AK 615 and the base station can update the Authenticator with the updated AK counter value 616. The intra-BS handover may transfer communication from a base station to a relay station, from a relay station to a base station, or from a first relay station to a second relay station.

In another relay deployment, the relay station can maintain a relay link with the base station. In terms of security association between the relay station and the base station, the relay station can be similar to a mobile station. Since the relay link can be the point of traffic aggregation and may likely be stationary (i.e., does not perform any handovers), the security association between the relay station and the base station may run out traffic encryption keys over time. In such a case, the relay station can perform an intra-BS handover procedure with its associated base station to refresh the AK* and/or CMAC/TEK keys, instead of performing a full network re-authentication, to ensure key freshness on the relay link.

A similar procedure for a handover between evolved Node Bs (eNode Bs or eNBs) and a relay node (RN) may be used in 3GPP LTE. In the 3GPP LTE systems, the eNB serves the similar function as a base station (the eNB may have multiple Medium Access Control/Radio Resource Control (MAC/RRC) entities to manage multiple cells) in an Evolved Universal Terrestrial Radio Access Network (E-UTRAN), which can communicate with the wireless mobile device, known as a user equipment (UE), which is equivalent to a mobile station in IEEE 802.16.

The intra-BS handover provides a mechanism to renew keys in a local manner without involving the Authenticator for key generation and/or transfer. The handover scheme designates the same base station as target and source, as well as updating the security key with a new counter that does not use inputs from the Authenticator.

Figure 7:
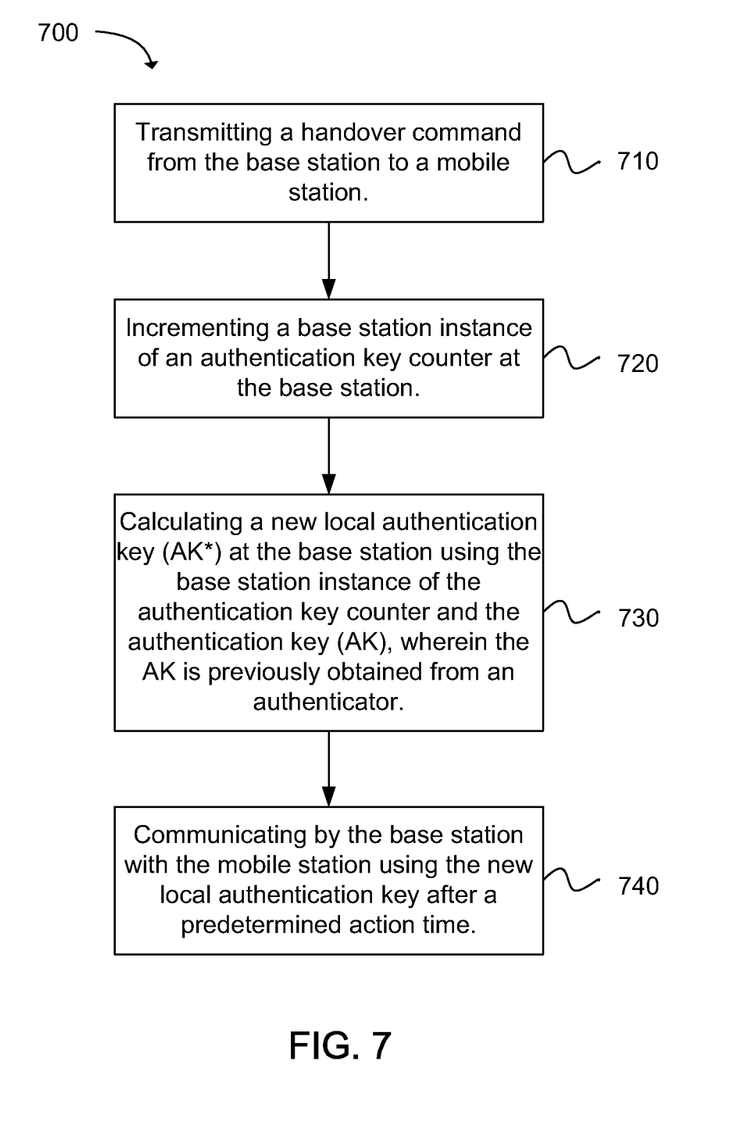
FIG. 7 depicts a flow chart of a method for updating a security key at a base station (BS) in accordance with an example.

Another example provides a method 700 for updating a security key at a base station (BS), as shown in the flow chart in FIG. 7. The method includes the operation of transmitting a handover command from the base station to a mobile station, as in block 710. The operation of incrementing a base station instance of an authentication key counter at the base station follows, as in block 720. The next operation of the method can be calculating a new local authentication key (AK*) at the base station using the base station instance of the authentication key counter and an authentication key (AK), wherein the AK is previously obtained from an authenticator, as in block 730. The method further includes communicating by the base station with the mobile station using the new local authentication key after a predetermined action time, as in block 740.

Figure 8:
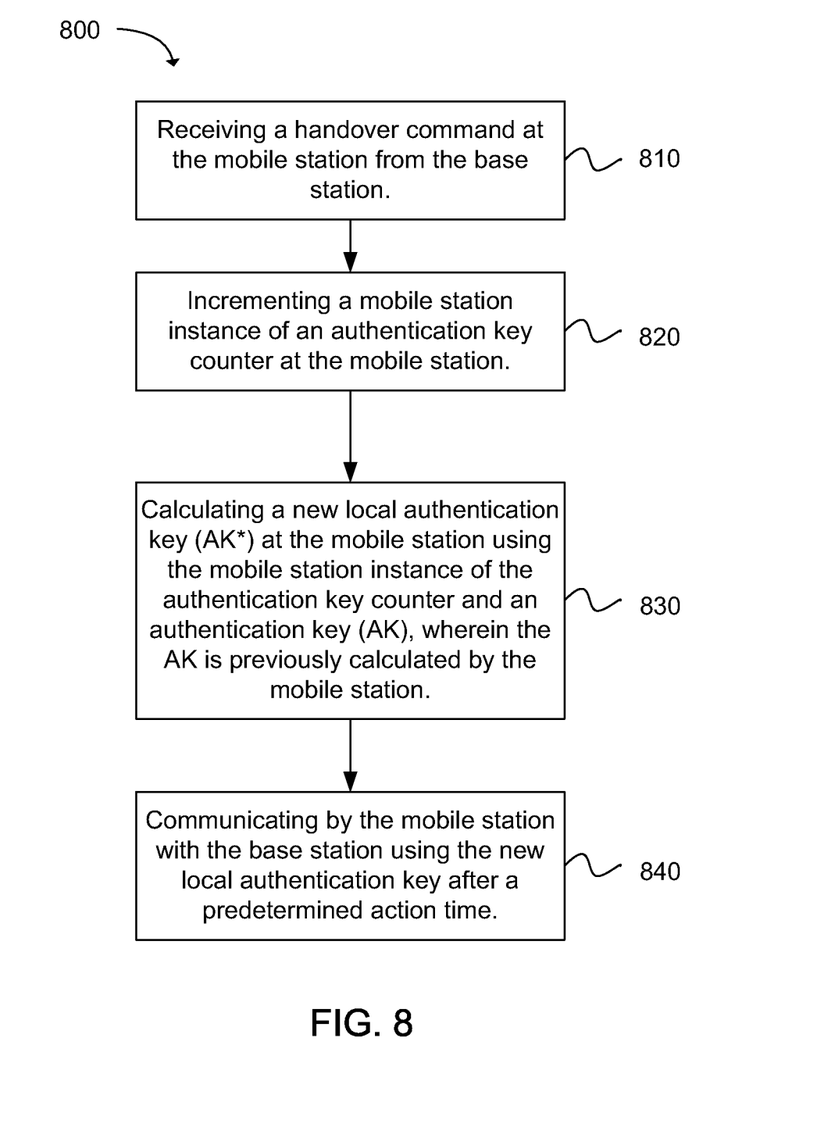
FIG. 8 depicts a flow chart of a updating a security key at a mobile station (MS) in accordance with an example.

Another example provides a method 800 for updating a security key at a mobile station (MS), as shown in the flow chart in FIG. 8. The method includes the operation of receiving a handover command at the mobile station from the base station, as in block 810. The operation of incrementing a mobile station instance of an authentication key counter at the mobile station, as in block 820. The next operation of the method can be calculating a new local authentication key (AK*) at the mobile station using the mobile station instance of the authentication key counter and an authentication key (AK), wherein the AK is previously calculated by the mobile station, as in block 830. The method further includes communicating by the mobile station with the base station using the new local authentication key after a predetermined action time, as in block 840.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for updating a security key at a base station (BS), comprising:
    transmitting a handover command from the base station to a mobile station;
    incrementing a base station instance of an authentication key counter at the base station;
    calculating a new local authentication key (AK*) at the base station using the base station instance of the authentication key counter and an authentication key (AK), wherein the AK is previously obtained from an authenticator; and
    communicating by the base station with the mobile station using the new local authentication key after a predetermined action time.

2. The method of claim 1, wherein transmitting the handover command further comprises setting the target base station equal to the serving base station.

3. The method of claim 1, further comprising verifying the new local authentication key at the base station using a new Cipher-based Message Authentication Code (CMAC) digest, wherein the base station receives a new CMAC digest from the mobile station calculated from the new local authentication key.

4. The method of claim 1, further comprising updating an authenticator instance of the authentication key counter at the authenticator with the base station instance of an authentication key counter value.

5. The method of claim 1, further comprising receiving a mobile station instance of an authentication key counter value from the mobile station.

6. The method of claim 5, further comprising updating a base station instance of an authentication key counter value with the mobile station instance of the authentication key counter value when the mobile station instance of the authentication key counter value is greater than the base station instance of the authentication key counter value.

7. The method of claim 1, further comprising:
    transmitting the new local authentication key by the base station to a relay station (RS) in communication with the base station; and
    communicating via the relay station with the mobile station using the new local authentication key.

8. The method of claim 7, wherein transmitting the handover command from the base station occurs when the mobile station transfers direct communication from the base station to the relay station, from the relay station directly to the base station, or from the relay station to an additional relay station.

9. The method of claim 1, wherein calculating the new local authentication key further comprises using a mobile station identification and a base station identification, wherein the mobile station identification is a mobile station Media Access Control (MAC) address and the base station identification is a base station MAC address.

10. The method of claim 1, wherein calculating the new local authentication key further comprises calculating the new local authentication key (AK*) using:

$$AK^* = KDF(AK, MSID|BSID|AK\_COUNT|"AK^*", Length)$$

where a Key Derivation Function (KDF) uses the AK, an MS Media Access Control (MAC) address for an MS identification (MSID), a BS MAC address for a BS identification (BSID), and a base station's up-to-date instance of the authentication key counter (AK_COUNT) to calculate the new local authentication key with a key size of Length.

11. The method of claim 1, further comprising deriving at least one of a Cipher-based Message Authentication Code (CMAC) key and a Transport Encryption Key (TEK) using the new local authentication key.

12. The method of claim 1, wherein transmitting the handover command is triggered by a Transport Encryption Key (TEK) counter rollover event.

13. The method of claim 1, further comprising obtaining an AK from the authenticator, wherein the AK is derived at the authenticator from a Pairwise Master Key (PMK) prior to obtaining the authentication key, where the PMK is generated between the mobile station (MS) and an Authentication, Authorization and Accounting (AAA) server as part of an Extensible Authentication Protocol (EAP) authentication, and the AAA server transmits the PMK to the Authenticator.

14. A method for updating a security key at a mobile station (MS), comprising:
    receiving a handover command at the mobile station from the base station to handover to a same current serving base station;
    incrementing a mobile station instance of an authentication key counter at the mobile station;
    calculating a new local authentication key (AK*) at the mobile station using the mobile station instance of the authentication key counter and an authentication key (AK), wherein the AK is previously calculated by the mobile station; and communicating by the mobile station with the base station using the new local authentication key after a predetermined action time.

15. The method of claim 14, further comprising transmitting a handover request to the base station by the mobile station to update the local authentication key with a requested target base station being the same current serving base station.

16. The method of claim 14, further comprising verifying the new local authentication key using a new Cipher-based Message Authentication Code (CMAC), wherein the mobile station transmit the new CMAC to the base station, where the new CMAC is calculated from the new local authentication key.

17. The method of claim 16, wherein verifying the new local authentication key using the new CMAC includes receiving a handover command with a base station calculated CMAC from the base station.

18. The method of claim 14, further comprising receiving a base station instance of an authentication key counter value from the base station.

19. The method of claim 14, wherein calculating the new local authentication key further comprises using a mobile station identification and a base station identification, wherein the mobile station identification is a mobile station Media Access Control (MAC) address and the base station identification is a base station MAC address.

20. The method of claim 14, wherein calculating the new local authentication key further comprises calculating the new local authentication key (AK*) using:

$$AK^* = KDF(AK, MSID|BSID|AK\_COUNT|\text{"AK"}, Length)$$

where a Key Derivation Function (KDF) uses the AK, a MS Media Access Control (MAC) address for a MS identification (MSID), a BS MAC address for a BS identification (BSID), and the mobile station instance of the authentication key counter (AK_COUNT) to calculate the new local authentication key with a key size of Length.

21. A base station (BS) having a local security key update, comprising:
a transceiver module for transmitting a handover command to a mobile station;
a counter module for increasing a base station instance of an authentication key counter;
a process or for deriving a new local authentication key (AK*) using the base station instance of the authentication key counter and an authentication key (AK), wherein the AK is previously obtained from an authenticator; and
a clock module for indicating a predetermined action time after which the transceiver module can communicate with the mobile station using the new local authentication key.

22. The base station of claim 21, wherein the transceiver module transmits the handover command with the target base station set to the serving base station.

23. The base station of claim 21, wherein the transceiver module updates an authenticator instance of the authentication key counter at the authenticator with the base station instance of an authentication key counter value.

24. A computer program product, comprising a non-transitory computer usable medium having a computer readable program code embodied therein, said computer readable program code adapted to be executed to implement a method for updating a security key at a mobile station (MS) comprising:
receiving a handover command at the mobile station from the base station;
increasing a mobile station instance of an authentication key counter at the mobile station;
deriving a new local authentication key (AK*) at the mobile station using the mobile station instance of the authentication key counter and an authentication key (AK), wherein the AK is previously calculated by the mobile station; and
communicating by the mobile station with the base station using the new local authentication key after a predetermined action time.

25. The medium of claim 24, wherein transmitting the handover command further comprises setting the target base station equal to the serving base station.

* * * * *